United States Patent [19]
Bottman et al.

[11] Patent Number: 5,570,029
[45] Date of Patent: Oct. 29, 1996

[54] CABLE CROSSTALK MEASUREMENT SYSTEM

[75] Inventors: Jeffrey S. Bottman; Eric R. Drucker, both of Seattle; Lannes S. Purnell, Edmonds, all of Wash.

[73] Assignee: Fluke Corporation, Everett, Wash.

[21] Appl. No.: 220,068

[22] Filed: Mar. 30, 1994

[51] Int. Cl.⁶ .................................................. G01R 27/28
[52] U.S. Cl. ........................... 324/628; 324/539; 324/620
[58] Field of Search ..................................... 324/533, 539, 324/540, 620, 627, 628; 377/20; 379/24, 26

[56] References Cited

U.S. PATENT DOCUMENTS

| | | | |
|---|---|---|---|
| 3,678,379 | 7/1972 | Arvay et al. | 324/539 |
| 3,745,266 | 7/1973 | Niedereder | 324/628 |
| 4,290,010 | 9/1981 | Blaess et al. | 324/628 |
| 5,063,351 | 11/1991 | Goldthorp et al. | 324/603 |
| 5,185,735 | 2/1993 | Ernst | 324/628 |
| 5,382,910 | 1/1995 | Walsh | 324/533 |

OTHER PUBLICATIONS

R. M. Brooks et al, "A Time Domain Crosstalk Test for Coaxial Cables", Proceedings of the 28th International Wire & Cable Symposium, Cherry Hill, NJ, USA (13–15 Nov. 1979), pp. 58–64.

*Primary Examiner*—Kenneth A. Wieder
*Assistant Examiner*—Glenn W. Brown
*Attorney, Agent, or Firm*—George T. Noe

[57] ABSTRACT

A cable crosstalk measurement system provides fault diagnostic information to locates faults in addition to providing a crosstalk versus frequency function to test and troubleshoot LAN cables. In a preferred embodiment, a narrow pulse is introduced into one twisted pair of a standard LAN cable, and another twisted pair in the same cable is monitored for crosstalk signal coupling. A measurement system digitizes crosstalk signals using sequential sampling of repetitive signals to provide a waveform record that is a reconstructed equivalent time representation of a real-time crosstalk signal. A microprocessor performs a fast Fourier transform of the waveform record to provide crosstalk versus frequency information, while the waveform record is also examined for higher-than-acceptable amplitude levels to locate poor quality or faulty connectors and cables.

12 Claims, 3 Drawing Sheets

CABLE CROSSTALK MEASUREMENT SYSTEM

BACKGROUND OF THE INVENTION

This invention relates generally to cable testing and troubleshooting, and in particular to measuring the crosstalk characteristics between adjacent pairs of cables and extracting diagnostic information to locate faults in cables.

Local Area Networks (LANs) formed by a large number of interconnected computers, work stations, printers, and file servers are becoming increasingly common in the modern office. In a typical installation, LAN cables may be routed through walls, floors, and ceilings of a building. LAN cable systems not only need to be checked out upon installation, but they require constant maintenance, upgrades, and troubleshooting because LAN cables and connectors are subject to breakage, offices and equipment must be moved, and new equipment are added. A LAN system is most commonly implemented by physically connecting all of these devices with copper-conductor, twisted-pair LAN cables, the most common being an eight-wire cable which is configured in four twisted-wire pairs (commonly referred to simply as "twisted pairs") within a flexible wrapper that may include an electrostatic shield, with each end of the cable terminated in an industry-standard connector.

Crosstalk level is a performance parameter indicating the level of signal coupling between separate but adjacent data transmission paths, and thus is of great importance for determining problems in twisted-pair cables in LAN systems. It is desirable that the level of isolation be high (and crosstalk level be low) to avoid interference between transmission paths. Accordingly, crosstalk measurement capability is highly desirable in any test tool to be used in LAN cable testing and troubleshooting.

More sophisticated LAN cable test instruments are often equipped for evaluating crosstalk through standardized near-end crosstalk (commonly referred to as "NEXT") measurements. A conventional method of measuring crosstalk, or NEXT, is to apply a high-frequency sine wave signal to one twisted pair of wires in the cable and measuring the crosstalk signal level in another of the twisted pairs of wires. The sine wave source is incremented in discrete steps across a range of frequencies, while making measurements, and a list of crosstalk versus frequency is generated. This list is compared with a worst-case crosstalk versus frequency function specified for the cable installation under test to determine compliance-that is, whether or not crosstalk levels are acceptable or not. However, this conventional method does not yield any useful diagnostic information to inform the user just exactly what the problem is nor how to fix it. For example, unacceptable crosstalk may be a result of a fault in the cable, such as the cable being physically crushed at some point, or simply a poor quality patch cord somewhere in a LAN run.

Conventional time domain reflectometers (TDRs) locate faults caused by substantial changes in impedance in a cable, such as opens and shorts, by measuring the elapsed time between a stimulus pulse and a reflected pulse on the same cable; however, such conventional TDRs cannot provide a crosstalk versus frequency function, nor locate a problem such as a faulty or poor quality patch cord that has a perfectly good impedance match to the twisted-pair LAN cable.

SUMMARY OF THE INVENTION

In accordance with the present invention, a cable crosstalk measurement system provides fault diagnostic information to locate the cause of poor crosstalk performance in addition to providing a crosstalk versus frequency function in order to test and troubleshoot twisted-pair LAN cables.

A cable test instrument applies stimulus signals to a selected one twisted pair in a LAN cable while monitoring crosstalk signal coupling on a separate but adjacent twisted pair within the same bundle or cable. A measurement system analyzes any crosstalk signals and provides diagnostic information for locating faults in the cable as well as providing crosstalk versus frequency information to determine whether acceptable or not.

A preferred embodiment of the present invention takes advantage of the wellknown fact that the frequency spectrum of a pulse may be determined primarily by the width and amplitude of the pulse. A pulse generator repetitively applies a relatively narrow stimulus pulse (e.g., on the order of four or five nanoseconds) to a switch matrix that directs the stimulus pulse to a selected one of a plurality of twisted pairs while connecting one of the other twisted pairs to a waveform digitizer. The waveform digitizer records the received crosstalk waveform by means of sequential sampling to provide a reconstructed equivalent-time waveform of the crosstalk signal. A fast Fourier transform (FFT) is performed on the digitized crosstalk waveform record to provide, when normalized and scaled, a table of crosstalk versus frequency information. This information may then be used to check against the specified worst-case crosstalk requirements for the particular LAN cable to determine compliance.

In addition, the digitized crosstalk waveform record is examined for relatively large spikes or peaks. The time of occurrence of a spike may be used to approximate with a fair degree of accuracy the physical location along the cable run of the event or situation causing the crosstalk spike. Timing information is provided by recording the elapsed time from the launch of a stimulus pulse to detection of the spike, and then distance to the fault may be calculated.

In an alternative embodiment, a cable test apparatus discriminates the location of spikes exceeding a predetermined threshold amplitude, and presents only distance-related faults to the user.

It is therefore one object of the present invention to provide a crosstalk measurement system for determining the location of a crosstalk fault or poor crosstalk performance in a multiple-transmission-line cable.

It is another object of the present invention to provide a crosstalk measurement system capable of measuring amplitude versus frequency characteristics of crosstalk between separate but adjacent transmission lines.

It is a further object of the present invention to provide both fault diagnostic information and crosstalk versus frequency information to test and troubleshoot LAN cables.

It is an additional object of the present invention to provide a cable testing and troubleshooting instrument capable of quickly and easily measuring and characterizing crosstalk in cables.

Other objects, features, and advantages of the present invention will become obvious to those having ordinary skill in the art upon a reading of the following description when taken in conjunction with the accompanying drawings.

DETAILED DESCRIPTION OF THE INVENTION

Figure 1:
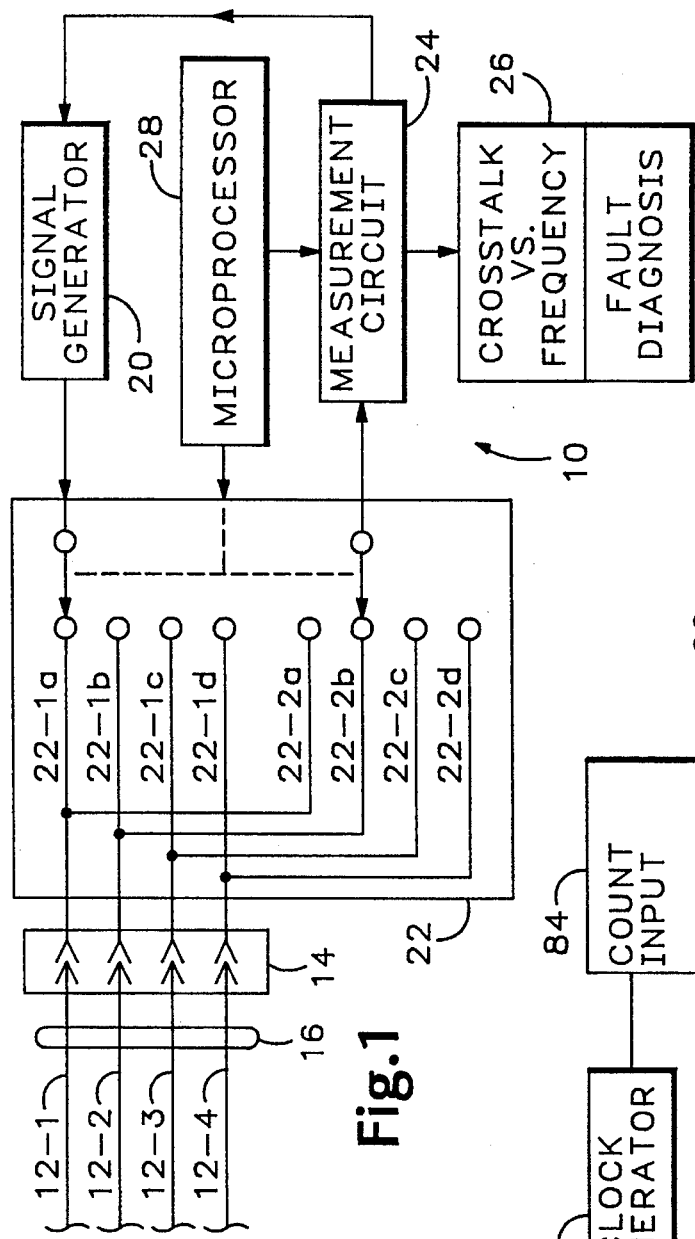
FIG. 1 is a generalized block diagram of a cable testing and troubleshooting apparatus in accordance with the present invention.

Referring to FIG. 1 of the drawings, there is shown a generalized block diagram of a cable testing and troubleshooting apparatus 10 coupled via an industry-standard connector 14 to one end of an exemplary LAN cable 12 which is configured in four twisted-wire pairs (or simply twisted pairs, as they are known in the relevant industry) 12-1, 12-2, 12-3, and 12-4 within a flexible sheath 16 that may function as an electrostatic shield. It should be pointed out that LAN cables typically are unshielded. A signal generator 20 within apparatus 10 generates stimulus signals to test the LAN cable 12, and such stimulus signals are applied via a switch matrix 22 to a selected one of the twisted-wire pairs. A measurement circuit 24 is coupled to a second one of the twisted-wire pairs via switch matrix 22 to receive any crosstalk signals, that is, signals that result in a coupling of the stimulus signal from the selected twisted-wire pair to the second one. Measurement circuit 24 analyzes the crosstalk signals and provides on a display device 26 crosstalk versus frequency information as well as diagnostic information for locating faults in the LAN cable. In the example shown, the output of signal generator 20 is connected to twisted pair 12-1 through the closed contacts 22-1a of switch matrix 22, and measurement circuit 24 is connected to twisted pair 12-2 through the closed contacts 22-2b of switch matrix 22. A microprocessor 28 provides overall control of the apparatus 10, including establishing signal routing and operation of switch matrix 22, and controlling measurement circuit 24 to analyze crosstalk signals. Measurement circuit 24 also issues command signals to signal generator 20 to generate stimulus signals.

In order to provide diagnostic information to locate faults in the LAN cable, a timing relationship must exist between stimulus signals generated by the signal generator 20 and crosstalk signals analyzed by the measurement circuit 24. To gain an appreciation of this timing, refer to the near-end crosstalk, or NEXT, measurement model of FIGS. 2A and 2B, which show respectively a model of the measurement structure and a waveform diagram.

Figure 2A:
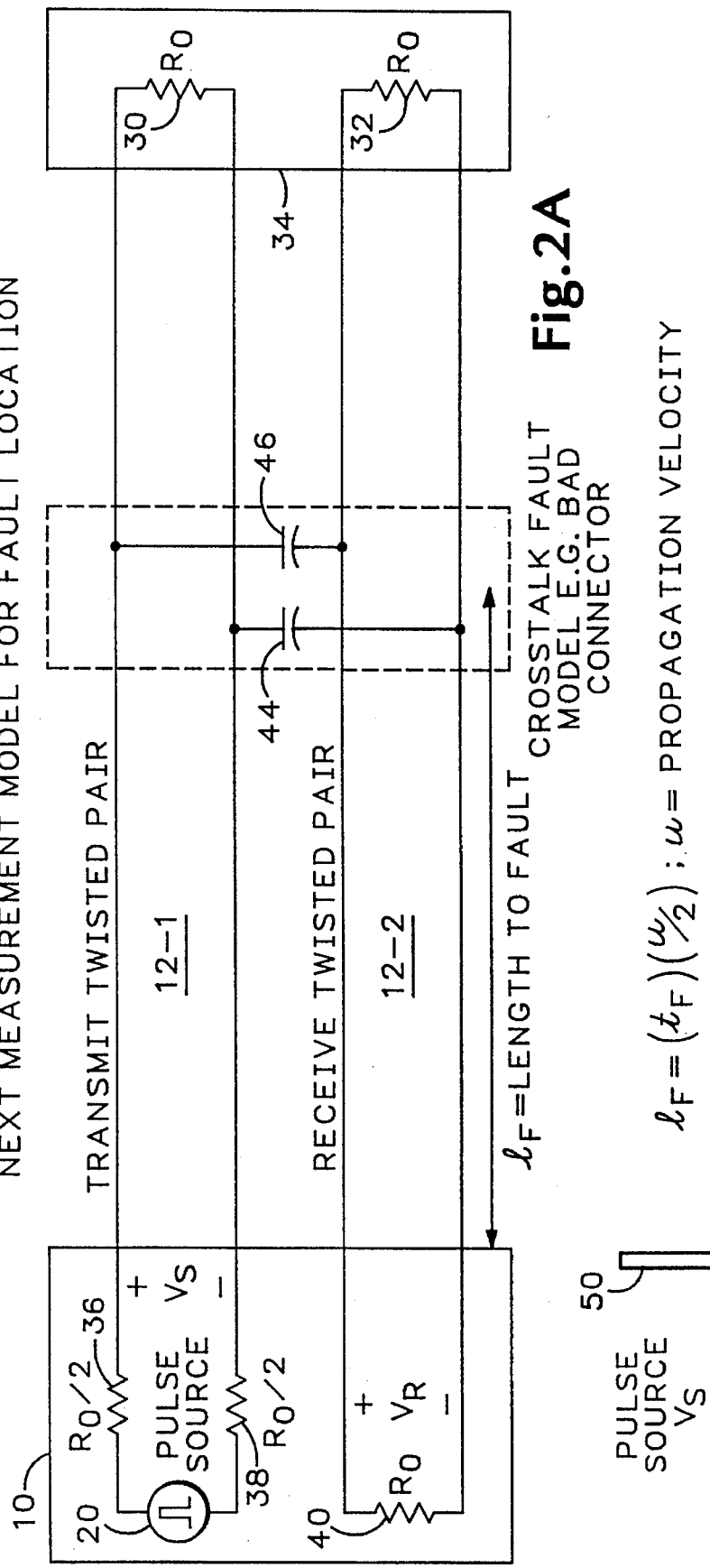
FIGS. 2A and 2B is near-end crosstalk (NEXT) model showing respectively a measurement structure and a waveform diagram.

In FIG. 2A, cable test instrument 10 is coupled to a near end of a cable including twisted pairs 12-1 and 12-2 in the manner described in connection with FIG. 1. The far end of each twisted pair in the model is terminated with termination resistors 30 and 32, which match the characteristic impedance of the cable. Termination resistors 30 and 32 may suitably be part of a remote unit 34 supplied with cable test instrument 10 connected to the far end of the cable. The near ends of twisted pairs 12-1 and 12-2 are likewise terminated with termination resistors 36 and 38, each of which are equal to one-half the characteristic impedance of the cable, and resistor 40. In a proposed commercial embodiment of the present invention, both the near and far ends of the cable are coupled to balanced-to-unbalanced transformers in order to achieve balanced cable drive and to facilitate functions other than the measurement system described herein; however, the equivalent circuit over the measurement frequency band is as shown in FIG. 2A. Signal generator 20, which suitably may be a pulse generator, generates a stimulus pulse which is launched down the transmission path of twisted pair 12-1. Any crosstalk coupled across to separate but adjacent twisted pair 12-2 propagates back to the measurement system and is developed as a received signal across resistor 40. Let us suppose that a fault, such as a bad connector, exists at some distance $L_F$ from the near end of cable 12. This fault is modeled by capacitors 44 and 46. It should be noted that the impedance represented by this type of fault is typically large relative to the characteristic impedance of the cable, and therefore would not be located by any test instruments that look for impedance discontinuities, such as time domain reflectometers and the like. However, the impedance modeled by capacitors 44 and 46 causes sufficient coupling to result in NEXT failure.

Figure 2B:
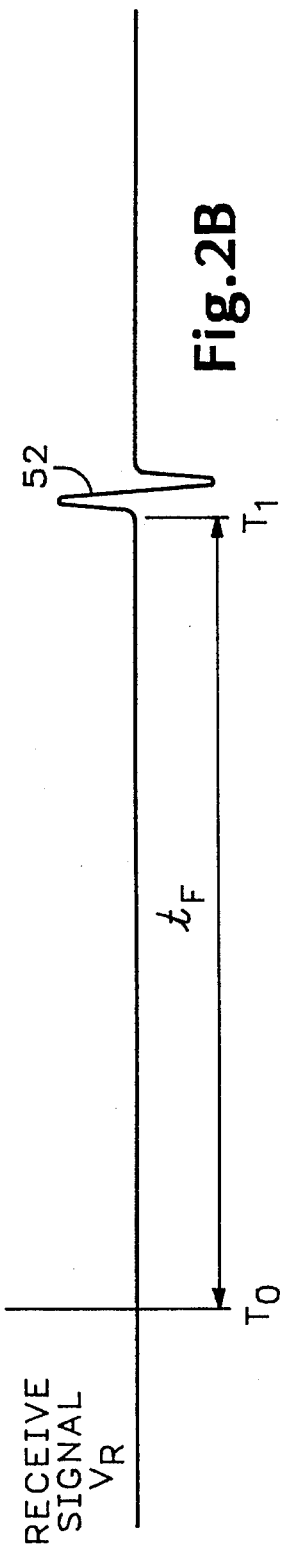

Referring now to FIG. 2B, a stimulus pulse 50 is generated by signal generator 20 and launched down the transmission path represented by twisted pair 12-1 at a time $T_0$. Pulse 50 propagates at a velocity V, which is a percentage of the speed of light and is approximately equal to eight inches per nanosecond (or 20 centimeters per nanosecond) in an electrical cable, down twisted pair 12-1 to the fault represented by capacitors 44 and 46, where it is coupled across to twisted pair 12-2. The coupled crosstalk signal in turn propagates back to cable test instrument 10 via twisted pair 12-2 at a velocity V, and arrives at resistor 40 after an elapsed time $T_F = T_1 - T_0 = 2L_F/V$. Waveform 52 represents that part of the received signal that is due to equivalent coupling capacitors 44 and 46. Distance to the fault (length of cable from instrument 10 to the fault) may then be calculated as $L_F = \frac{1}{2} T_F V$.

A cable testing and troubleshooting apparatus in accordance with a preferred embodiment takes advantage of the well-known fact that the frequency spectrum of a pulse may be determined primarily by the width and amplitude of a pulse such as pulse 50. A relatively narrower pulse 50, e.g., on the order of five nanoseconds, will produce a frequency spectrum that has a greater percentage of its power at higher frequencies, e.g., up to about 100 megahertz, while a relatively wider pulse 50, e.g., on the order of 30 nanoseconds, will produce a frequency spectrum that has a greater percentage of its power at lower frequencies, e.g., up to about 20 megahertz.

Figure 3:
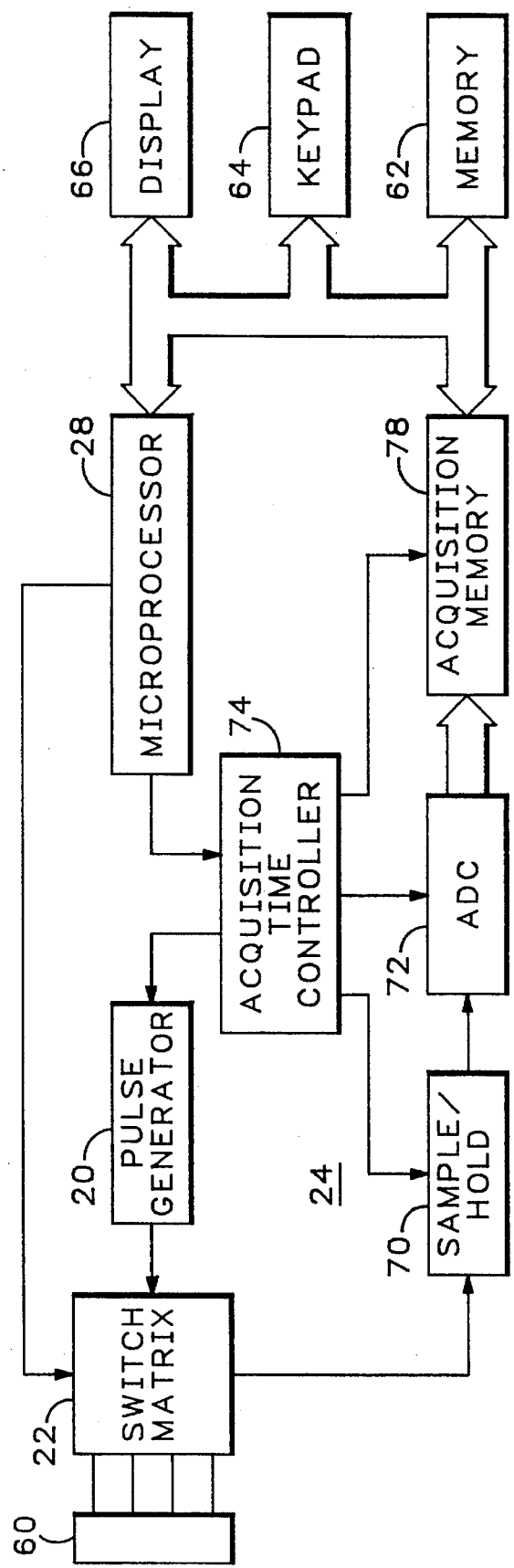
FIG. 3 is a preferred embodiment of the present invention in detailed block diagram form.

A preferred embodiment of the present invention is shown in FIG. 3. Cable test apparatus 10 includes a connector 60 for connecting the cable test apparatus to a cable under test. The connector 60 may be selected to accommodate any type of cable or any number of transmission lines. In the embodiment shown, connector 60 is an industry-standard RJ-45 connector adapted to mate with the connector of a conventional eight-wire LAN cable which is configured in four twisted-wire pairs. Signal generator 20 is a pulse generator which generates a relatively narrow pulse, e.g., on the order of five nanoseconds as described above, upon initiation of a pulse command signal from an acquisition timing controller 74 (to be discussed later), which in turn is controlled by microprocessor 28. The pulses are repetitively produced about eight microseconds apart, which allows sufficient time to sample crosstalk signals from faults that are a substantial distance from the measurement system so that the measurement system can be used to detect crosstalk faults on virtually any local area network.

Microprocessor 28 is connected via a typical bus structure to a memory 62, which may include both random-access and read-only memories, a keypad 64 for entry of user-defined information, and a display device 66, which may be a flat-panel liquid-crystal display (LCD) device and its associated display circuitry.

Microprocessor 28 also provides a control signal to switch matrix 22, which may suitably consist of digitally-controlled relays of conventional design for routing a stimulus pulse from signals generator 20 to a selected twisted pair, and crosstalk signals from another twisted pair to measurement circuit 24.

Measurement circuit 24 is a waveform digitizer similar to that used for digitizing waveforms of input signals in a conventional digital storage oscilloscope, and therefore includes conventional and well known elements, and is operated in a conventional mode known in art as sequential sampling wherein samples acquired from a number of repetitive signals are later reconstructed in an equivalent-time record representing one real-time signal. This permits sampling a higher effective rate than the available sampling clock rate, which is required to sample crosstalk signals which are artifacts of five-nanosecond duration stimulus pulses.

Crosstalk signals received via switch matrix 22 from the twisted pair being monitored are applied to a sample/hold amplifier 70 which freezes the amplitude of the crosstalk signal long enough to be converted to a digital representation by analog-to-digital converter (ADC) 72. If desired, suitable signal conditioning circuits, such as amplifiers, attenuators, filters, etc., may be interposed in the signal path before digitizing in order to match signal conditions with the capabilities of the waveform digitizer.

Acquisition timing is provided by acquisition timing controller 74, which may suitably be a digital signal processor (DSP) in combination with a programmable logic device and a high-speed (about 60 megahertz in this embodiment) clock oscillator to provide the desired timing and control. Acquisition time controller 74 initiates pulse command signals to signal generator 20, as discussed earlier, and also applies sample/hold signals to sample/hold amplifier 70 and conversion control signals to ADC 72 at a rate of about four megahertz. The sample/hold and ADC control signals are generated in progressively increasing delay increments of two nanoseconds via an internal delay line following initiation of pulse command signals applied to signal generator 20. Thus, while the conversion rate of sample/hold amplifier 70 and ADC 72 in this embodiment is about four megahertz, the well-known sequential sampling technique permits an effective sampling rate of 500 megahertz. In accordance with the well known Nyquist sampling theorem, this permits sampling crosstalk signals in a frequency spectrum to 250 megahertz.

The converted digitized samples, each representing an instantaneous amplitude of the received crosstalk signal, are transported by the acquisition timing controller to a fast acquisition waveform memory 78. Although the samples are not obtained in chronological order, they are reordered into their proper time sequence when stored in memory 78, as is well known to those skilled in the art. Thereafter, the waveform record is retrieved by microprocessor 28 and moved to memory 62. Thus, the waveform digitizer records the received crosstalk waveform by means of sequential sampling to provide a reconstructed equivalent-time waveform of the crosstalk signal.

A fast Fourier transform (FFT) is performed by microprocessor 28 on the digitized crosstalk waveform record to provide, when normalized and scaled, a table of crosstalk versus frequency information which may be viewed on display device 66. This information may then be used to check against the specified worst-case crosstalk requirements for the particular LAN cable installation to determine compliance.

In addition, the digitized crosstalk waveform record is examined for relatively large spikes or peaks. The time of occurrence of a spike may be used to approximate with a fair degree of accuracy the physical location along the cable run of the event or situation causing the crosstalk spike. Timing information is provided by recording the elapsed time from the launch of a stimulus pulse to detection of the spike, and then distance to the fault may be calculated.

Figure 4:
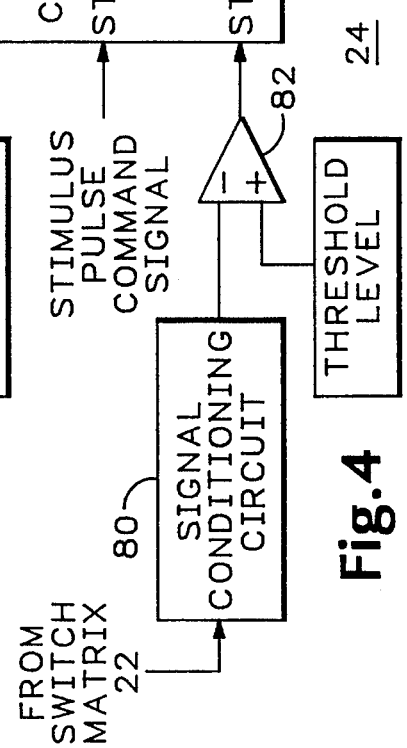
FIG. 4 is a block diagram of an alternative embodiment of the present invention.

In an alternative embodiment of measurement circuit 24 shown in FIG. 4, a cable test apparatus discriminates the location of spikes exceeding a predetermined threshold amplitude, and presents only distance-related faults to the user. Crosstalk signals received via switch matrix 22 are coupled to a signal conditioning circuit 80, which adjusts the signals to a suitable level for comparison with a predetermined threshold level by comparator 82. That is, if a crosstalk spike or peak voltage exceeds a predetermined level, the output of comparator 82 changes states. A counter 84 is enabled by initiation of a stimulus pulse and counts high-speed clock signals from a clock 86 until count is stopped by the output of comparator 82. The elapsed time from counter 84 may be read out directly in terms of distance on display device 90.

While we have shown and described the preferred embodiment of our invention, it will be apparent to those skilled in the art that many changes and modifications may be made without departing from our invention in its broader aspects. For example, signal generator 20 generate gated-on short-duration bursts of high frequency sine wave signals to build a crosstalk versus frequency table similar to that produced by conventional cable testers, with the time information for diagnostic fault location being extracted from the gating commands. Also, with appropriate controls and additional circuitry, measurement circuit 24 could be implemented by those skilled in the art as a conventional random-sampling waveform digitizer. Alternatively, single shot acquisition could be implemented with suitable high-speed waveform digitizer circuits and attendant increased cost. It is therefore contemplated that the appended claims will cover all such changes and modifications as fall within the true scope of the invention.

What we claim as our invention is:

1. A cable testing apparatus, comprising:

a signal generator for generating stimulus signals for a first transmission line in a cable under test;

a measurement system including a waveform digitizer connected to a second transmission line in said cable under test to receive and provide a digitized waveform record of crosstalk signals produced in response to said stimulus signals, said measurement system further including means for measuring crosstalk signal levels and elapsed time following generation of said stimulus signals to provide an indication of a location of crosstalk signals which exceeds a predetermined level.

2. A cable test apparatus in accordance with claim 1 wherein said measurement system also provides an indication of crosstalk versus frequency.

3. A cable test apparatus in accordance with claim 1 wherein said stimulus signals are relatively short-duration pulses.

4. A cable test apparatus in accordance with claim 1 wherein said measurement system further includes means for detecting crosstalk signals which exceed a predetermined threshold means for measuring the elapsed time between generation of said stimulus signal and said detected crosstalk signals, and means for calculating from said elapsed time a distance along said cable under test.

5. A cable test apparatus in accordance with claim 1 further including means for analyzing said digitized waveform record to provide crosstalk versus frequency information.

6. A cable test apparatus in accordance with claim 5 wherein said means for analyzing said digitized waveform record is a processor which performs a fast Fourier transform.

7. A system for determining the location of a crosstalk fault in a pair of transmission lines, comprising:

a pulse generator coupled to one of said pair of transmission lines, said pulse generator generating and applying a pulse to said one of said pair of transmission lines responsive to a transmit initiate pulse applied to said pulse generator;

a waveform digitizer coupled to another of said pair of transmission lines, said waveform digitizer periodically converting samples of a crosstalk signal on said another of said pair of transmission lines to digital representations; and processor means coupled to said waveform digitizer to perform an analysis on said digital representations to provide an indication of a location of crosstalk between said pair of transmission lines.

8. A system in accordance with claim 7 wherein said processor means further provides an indication of a magnitude of said crosstalk at each of said crosstalk locations.

9. A cable testing apparatus, comprising:

a signal generator for generating stimulus pulses having a predetermined amplitude and a predetermined frequency spectral content for a first transmission line in a cable under test;

a measurement system connected to a second transmission line in said cable under test to receive crosstalk signals produced in said second transmission line in response to said stimulus pulses in said first transmission line, said measurement system including a waveform digitizer to provide a digitized waveform record of said crosstalk signals; and a signal processing circuit coupled to said measurement system and receiving said digitized waveform record of said crosstalk signals for measuring crosstalk signal levels and elapsed time following generation of said stimulus pulses to provide at least one location within said cable under test where crosstalk signals exceed a predetermined level.

10. A cable test apparatus in accordance with claim 9 wherein said signal processing circuit further extracts from said digitized waveform record crosstalk amplitude versus frequency information over said predetermined frequency spectrum of said stimulus pulse.

11. A cable test apparatus in accordance with claim 10 wherein said signal processing circuit employs a Fast Fourier Transform to extract said crosstalk amplitude versus frequency information from said digitized waveform record.

12. A cable test apparatus in accordance with claim 9 wherein said measurement circuit and said signal processing circuit further detect crosstalk signals which exceed a predetermined threshold, measure the elapsed time between said stimulus signal and said detected crosstalk signals, and calculate from said elapsed time a distance along said cable under test.

* * * * *